March 13, 1962     B. SOLOW     3,025,485

RHEOSTAT

Filed Sept. 21, 1959

INVENTOR.
BENJAMIN SOLOW

BY *Donald S. Cohen*

ATTORNEY

United States Patent Office 3,025,485
Patented Mar. 13, 1962

3,025,485
RHEOSTAT
Benjamin Solow, North Hollywood, Calif., assignor to International Resistance Company, Philadelphia, Pa.
Filed Sept. 21, 1959, Ser. No. 841,143
8 Claims. (Cl. 338—77)

The present invention relates to a rheostat, and more particularly to a four terminal rheostat for use in calibrating electrical resistance bridges.

Heretofore, electrical resistance bridges were calibrated by connecting a "standard" resistor of a known value in the unknown arm of the bridge, and calibrating the bridge against the known value of the "standard" resistor. To calibrate such bridges at various values in this manner, it is necessary to have a number of "standard" resistors of different values. This is not only expensive because of the high cost of such "standard" resistors, but such "standard" resistors are only available in a limited number of resistance values.

If it is necessary to calibrate a resistance bridge at an odd resistance value or a value at which "standard" resistors are not made, it becomes necessary to connect two or more of such "standard" resistors in series and/or parallel relation to obtain the desired value. A problem in connecting such "standard" resistors together is that contact resistance is set up at each of the connections of the "standard" resistors. Such contact resistance across the connections is an unknown value which varies the total resistance of the "standard" resistors so that one can never be sure that the total resistance of the "standard" resistors is the desired value. In addition, such contact resistance may vary the total resistance of the "standard" resistors sufficiently so that an accurate calibration of the bridge cannot be obtained.

In order to overcome the high cost and possible inaccuracies caused by the use of series and/or parallel connected "standard" resistors in the calibration of resistance bridges, a multi-decade step type rheostat would be desirable. However, such rheostats presently available comprise a number of groups of resistors, with the resistors in each group connected in series, and each group covering a separate decade. Thus, the first group of resistors provides the decade of resistance values from 1 to 10, the next group provides the decade of resistance values from 10 to 100, etc. Each decade group of the resistors has a movable contact by which the resistance value of each group is varied. The groups are electrically connected together by the movable contact of each lower decade being connected in series with the resistors of the next higher decade. This type of rheostat has the disadvantage that each movable contact provides a contact resistance so that across the entire rheostat there is provided a number of contact resistances in series, which adversely affect the accuracy of the rheostat for calibrating purposes.

Therefore, it would be desirable to have a rheostat for use as a calibrating device which has a minimum of contact resistance. Also, for calibrating resistance bridges, it is desirable to connect each arm of the bridge separately to the calibrating rheostat to further minimize the contact resistance. Therefore, such a rheostat should be a four terminal rheostat.

It is an object of the present invention to provide a novel rheostat.

It is another object of the present invention to provide a novel four terminal rheostat.

It is a further object of the present invention to provide a four terminal rheostat for use in calibrating resistance bridges.

Other objects will appear hereinafter.

For the purpose of illustrating the present invention there is shown in the drawings a form which is presently preferred; it being understood, however, that this invention is not limited to the precise arrangements and instrumentalities shown.

Figure 1:
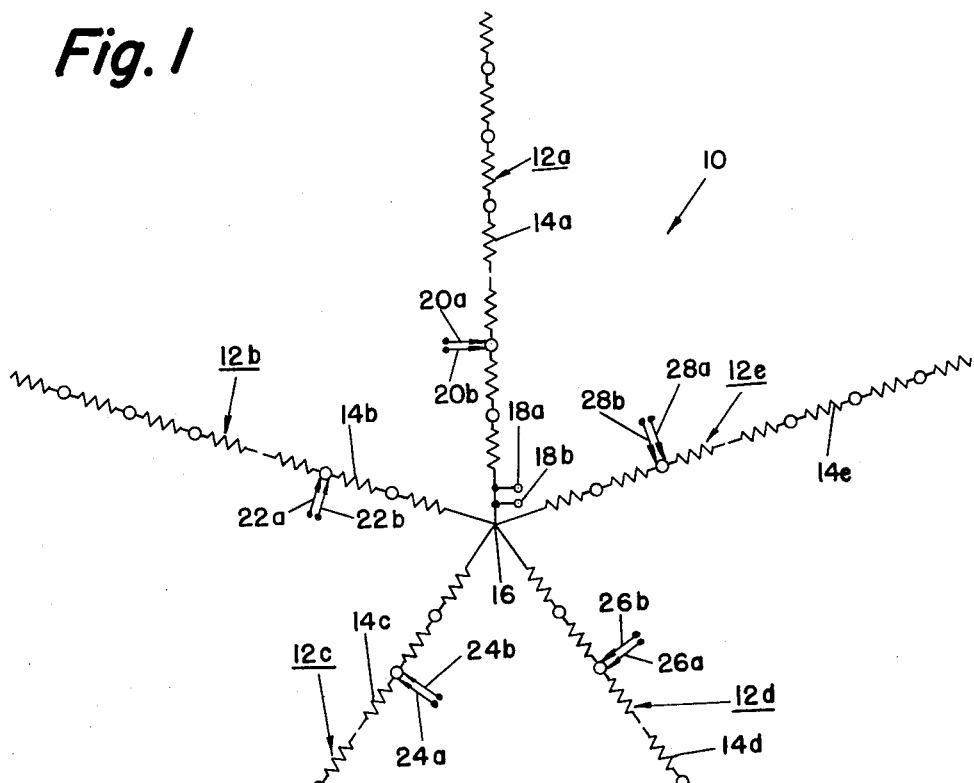
FIGURE 1 is an electrical circuit diagram of the rheostat of the present invention.

Referring initially to FIGURE 1, the rheostat of the present invention is generally designated as 10.

Rheostat 10 comprises five (5) groups of series connected resistors 12a, 12b, 12c, 12d, and 12e. Each of the groups 12a, 12b, 12c, 12d, and 12e of resistors includes nine (9) resistors connected in series. The resistors 14a in group 12a are each of a value of one ohm. The resistors 14b of the group 12b are each of a value of ten ohms. The resistors 14c of the group 12c are each of a value of one hundred ohms. The resistors 14d of the group 12d are each of a value of one thousand ohms, and the resistors 14e of the group 12e are each of a value of ten thousand ohms. The resistor groups 12a, 12b, 12c, 12d and 12e are all connected together at one common point 16.

A pair of terminals 18a and 18b are electrically connected to the common connection 16 of the resistor groups 12a, 12b, 12c, 12d, and 12e. A pair of side-by-side, but electrically insulated contacts 20a and 20b are movable in unison along the resistors 14a of the group 12a. Thus, by moving the contacts 20a and 20b along the connections between the resistors 14a, any resistance value from one to nine ohms can be obtained between the terminals 18a and 18b, and the contacts 20a and 20b. A similar pair of contacts 22a and 22b are movable along the resistors 14b of the group 12b. Thus, by moving the contacts 22a and 22b along the connection between the resistors 14b, a desired resistance value in the decade of ten to a hundred ohms can be obtained between the terminals 18a and 18b, and the contacts 22a and 22b. Likewise, a pair of movable contacts 24a and 24b is provided along the resistors 14c of the group 12c, a pair of movable contacts 26a and 26b is provided along the resistors 14d of the group 12d, and a pair of movable contacts 28a and 28b is provided along the resistors 14e of the group 12e.

By measuring the resistance between the contacts 20a and 20b and the contacts 22a and 22b, any two digit resistance value can be obtained by moving the contacts 20a and 20b along the group of resistors 12a and by moving the contacts 22a and 22b along the group of resistors 12b. By measuring the resistance between the contacts 22a and 22b and the contacts 24a and 24b, any desired three digit resistance value can be obtained which will be accurate to the first two highest digits. By measuring the resistance value between the contacts 24a and 24b and the contacts 26a and 26b, any desired four digit resistance value can be obtained which will be accurate to the first two highest digits. By measuring the resistance value between the contacts 26a and 26b and the contacts 28a and 28b, any desired five digit resistance value can be obtained which will be accurate to the first two highest digits. Thus, the rheostat 10 of the present invention will provide any desired resistance value within the range of the rheostat 10 which value is accurate to the first two highest digits.

It has been found that when calibrating a resistance bridge, for all practical purposes it is only necessary to calibrate any resistance setting of the bridge to the first two highest digits of the setting. For example, if a resistance bridge is being calibrated at a resistance setting of 437 ohms, it is only necessary to calibrate the bridge to 430 ohms, and the bridge will still be very accurate. If the bridge is made up of resistors which have a tolerance of 10%, and the bridge is accurately calibrated to 430 ohms, the most that the bridge can be off from the setting of 437 ohms is by 10% of 7 ohms, or 0.7 ohm. An inaccuracy of 0.7 ohm at a setting of 437 ohms provides the bridge with an accuracy of 0.1%, which is relatively very accurate. Thus, even if the bridge being calibrated is made up of resistors having a tolerance of 10%, which is very high for even commercial resistors, the rheostat 10 of the present invention can calibrate the bridge to provide the bridge with an accuracy of at least 0.1%. However, most bridges are made up of precision resistors having a tolerance of 1% or lower. Thus, such resistance bridges can be calibrated with the rheostat 10 of the present invention to provide the resistance bridge with an accuracy of at least 0.01%.

Thus, even though the rheostat 10 of the present invention calibrates a resistance bridge merely to the first two highest digits of any setting of the bridge, the calibrated bridge, will have a relatively high degree of accuracy. In addition, since all of the groups of resistors of the rheostat 10 are connected at a common point, the movable contacts 20, 22, 24, 26, and 28 contact the groups of resistors 12a, 12b, 12c, 12d, and 12e respectively at the ends of any resistance path being measured. Thus, in the rheostat 10 of the present invention, unlike the normal rheostat, there are no contacts between the contacts to the ends of any resistance path being measured, so that the contact resistance along such path is at a minimum. Thus, the rheostat 10 of the present invention provides only a minimum amount of contact resistance so as to permit a more accurate calibration. Also, by having a pair of movable contacts along each of the groups of resistors, a four terminal rheostat is obtained.

Figure 2:
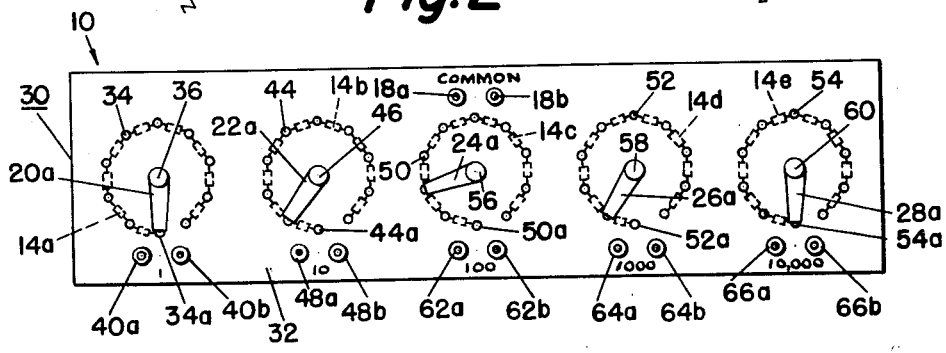
FIGURE 2 is a top plan view of the rheostat of the present invention.
Figure 3:
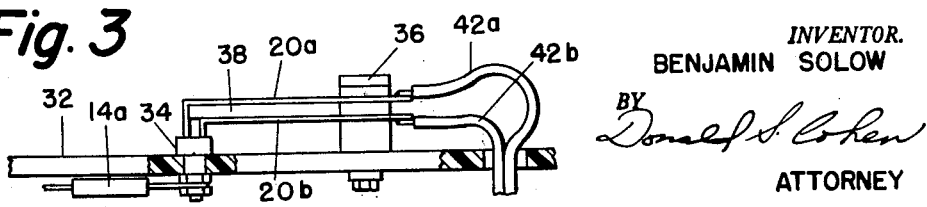
FIGURE 3 is a sectional view of the rheostat of the present invention showing the movable contact.

Referring to FIGURE 2, the rheostat 10 of the present invention can be arranged in a box 30 having a flat top 32 of an electrically insulating material. Ten stationary contacts 34 of an electrically conductive metal extend through the top 32 and are uniformly spaced around a circle. The resistors 14a are within the box 30, and are connected in series arrangement between the stationary contacts 34 starting with the contact 34a.

A mounting post 36 is secured to the top 32 at the center of the circle of the stationary contacts 34. The movable contacts 20a and 20b are rotatably mounted on the mounting post 36, and are selectively engageable with the stationary contacts 34. The movable contacts 20a and 20b each comprises a flat strip of an electrically conductive metal which is rotatably mounted at one end on the mounting post 36. The movable contacts 20a and 20b are parallel with respect to each other, and extend radially from the mounting post 36 to a point over the stationary contacts 34. The outer ends of the movable contacts 20a and 20b are bent downwardly to engage the stationary contacts 34. A strip 38 of an electrically insulating material extends between the contacts 20a and 20b to insulate the contacts 20a and 20b from each other. The movable contacts 20a and 20b rotate in unison around the mounting post 36 so that both of the contacts 20a and 20b simultaneously engage the same stationary contact 34. A pair of terminals 40a and 40b extend through and are secured to the top 32 adjacent the stationary contacts 34. A pair of wires 42a and 42b electrically connect the movable contacts 20a and 20b respectively to the terminals 40a and 40b respectively.

A second group of ten stationary contacts 44 are mounted on the top 32 in a circle. The resistors 14b are connected in series between the stationary contacts 44 starting with the contact 44a. The movable contacts 22a and 22b are rotatably mounted on a mounting post 46 which is at the center of the circle of the stationary contacts 44. The movable contacts 22a and 22b extend radially from the mounting post 46 to selectively engage the stationary contacts 44 upon rotation of the movable contacts 22a and 22b around the mounting post 46. The movable contacts 22a and 22b are electrically connected to the terminals 48a and 48b respectively. Similarly, the resistors 14c, 14d, and 14e are connected between the stationary contacts 50, 52, and 54 respectively. The movable contacts 24a and 24b, 26a and 26b, and 28a and 28b are rotatably mounted on the mounting posts 56, 58, and 60 respectively, and are selectively engageable with the stationary contacts 50, 52, and 54 respectively. The movable contacts 24a and 24b are electrically connected to the terminals 62a and 62b respectively, the movable contacts 26a and 26b are electrically connected to the terminals 64a and 64b respectively, and the movable contacts 28a and 28b are electrically connected to the terminals 66a and 66b respectively. The end contacts 34a, 44a, 50a, 52a, and 54a, of the stationary contacts 34, 44, 50, 52, and 54 are each electrically connected to each of the common terminals 18a and 18b which extend through the top 32. Thus, by connecting to the various terminals of the rheostat 10 of the present invention and by rotating the various movable contacts, any desired resistance value can be obtained within the range of the rheostat 10 which will be accurate to the highest two digits of the resistance value.

Although the rheostat 10 of the present invention is shown as being made up of five decade groups of resistors, the rheostat 10 can be made up of a fewer or greater number of the decade groups of resistors. Also, the rheostat 10 of the present invention can be used as a two terminal rheostat as well as a four terminal rheostat by using only one terminal of each pair of terminals.

The present invention may be embodied in other specific forms without departing from the spirit or essential attributes thereof and, accordingly, reference should be made to the appended claims, rather than to the foregoing specification as indicating the scope of the invention.

I claim:

1. A rheostat comprising a plurality of groups of series connected electrical resistors, one end of each of said groups being fixedly connected together at a common point, the other end of each of said groups being unconnected, the resistors in each of said groups being of substantially identical resistance value, each of said groups covering a different decade of resistance values, and a separate contact movable along each of said groups to vary the resistance value along the group between the movable contact and the common point.

2. A rheostat in accordance with claim 1 in which each of the groups of resistors comprises nine resistors, and the resistance value of each of the resistors in each group is $1 \times 10^x$ ohms where $x$ is equal to or greater than zero and increases from group to group.

3. A rheostat in accordance with claim 2 in which each of said movable contacts comprises a pair of contacts insulated from each other, each pair of contacts being movable simultaneously along its respective group of resistors for simultaneous engagement with the same point along the group.

4. A rheostat in accordance with claim 2 including a pair of terminals connected to the common point of said groups and insulated from each other.

5. A rheostat comprising a box having a top of electrical insulating material, a plurality of groups of stationary contacts extending through said top, the stationary contacts of each of said groups being arranged spaced around a circle, a separate group of electrical resistors connected in series arrangement between the stationary contacts of each of the groups of contacts, the stationary contact of each of said groups of stationary contacts at one end of the series connected resistors being fixedly electrically connected to a common terminal, and a separate movable contact rotatably mounted on said top at the center of each of said groups of stationary contacts and selectively engageable with said stationary contacts, the resistance values of each of said groups of resistors being such that each group of resistors covers a separate decade of resistance values.

6. A rheostat in accordance with claim 5 in which the resistors in each group of resistors are of substantially the same resistance value, and the resistance value of each of the resistors in each group is $1 \times 10^x$ ohms where $x$ is equal to or greater than zero and increases from group to group.

7. A rheostat in accordance with claim 6 in which each of the movable contacts comprises two separate contacts rotatably mounted on a common mounting post and insulated from each other, said pair of contacts being movable along the stationary contacts and simultaneously engaging the same stationary contact, and each of said separate contacts is electrically connected to a separate terminal.

8. A rheostat in accordance with claim 7 in which there are two separate common terminals and the end stationary contact of each of the groups of stationary contacts is electrically connected to both of said common terminals.

References Cited in the file of this patent

UNITED STATES PATENTS

| 1,783,542 | Merle | Dec. 2, 1930 |
| 1,930,545 | Wensley | Oct. 17, 1933 |
| 2,447,780 | Underwood et al. | Aug. 24, 1948 |

FOREIGN PATENTS

| 210,163 | Great Britain | Jan. 28, 1924 |